United States Patent [19]

Ohgoda

[11] Patent Number: 4,931,641
[45] Date of Patent: Jun. 5, 1990

[54] RADIATION IMAGE READ-OUT APPARATUS

[75] Inventor: Makoto Ohgoda, Kanagawa, Japan

[73] Assignee: Fuji Photo Film Co., Ltd., Kanagawa, Japan

[21] Appl. No.: 246,390

[22] Filed: Sep. 19, 1988

[30] Foreign Application Priority Data

Sep. 18, 1987 [JP] Japan .................................. 62-234291

[51] Int. Cl.$^5$ ..................... H05B 33/00; G03B 42/02; G03B 42/04
[52] U.S. Cl. .............................. 250/327.2; 250/484.1; 378/174; 378/182
[58] Field of Search ........................ 250/327.2, 484.1; 378/172, 173, 174, 182

[56] References Cited

U.S. PATENT DOCUMENTS

| | | | |
|---|---|---|---|
| 4,104,529 | 8/1978 | Gaudel | 378/172 |
| 4,777,365 | 10/1988 | Torii et al. | 250/327.2 |
| 4,845,734 | 7/1989 | Maki et al. | 378/172 |

FOREIGN PATENT DOCUMENTS 0192240  4/1983  Japan .................................. 250/327.2

Primary Examiner—Constantine Hannaher
Assistant Examiner—J. Eisenberg
Attorney, Agent, or Firm—Sughrue, Mion, Zinn, Macpeak & Seas

[57] ABSTRACT

A radiation image read-out apparatus comprises a sheet feed section capable of selectively holding a cassette for housing a single stimulable phosphor sheet carrying a radiation image stored thereon or a magazine for housing a plurality of stimulable phosphor sheets each carrying a radiation image stored thereon. The sheet feed section is provided with a sheet take-out device for taking the stimulable phosphor sheet out of the cassette and the magazine. A read-out section is provided for reading out the radiation image by exposing the stimulable phosphor sheet to stimulating rays which cause the stimulable phosphor sheet to emit light in proportion to the stored radiation energy, and photoelectrically detecting the emitted light. A sheet conveyor conveys the stimulable phosphor sheet taken out of the sheet feed section to the read-out section.

4 Claims, 4 Drawing Sheets

RADIATION IMAGE READ-OUT APPARATUS

BACKGROUND OF THE INVENTION

1. Field of the Invention

This invention relates to a radiation image read-out apparatus for use in a radiation image recording and reproducing system. This invention particularly relates to a radiation image read-out apparatus which is made small by simplification of the internal mechanism.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording material such as a photographic film, a display device such as a cathode ray tube (CRT), or the like.

A radiation image read-out apparatus in the aforesaid radiation image recording and reproducing system comprises a cassette holding section to which a stimulable phosphor sheet carrying a radiation image stored thereon in an external image recording apparatus is fed in the form housed in a cassette, a read-out section for scanning the stimulable phosphor sheet by stimulating rays which cause the stimulable phosphor sheet to emit light in proportion to the stored radiation energy and photoelectrically detecting the emitted light, and a sheet conveyance means for conveying the stimulable phosphor sheet taken out of the cassette at the cassette holding section to the read-out section.

On the other hand, in the external image recording apparatus, besides the image recording on the stimulable phosphor sheet housed in the cassette, image recording may be carried out on a plurality of the stimulable phosphor sheets taken one by one out of a sheet feed magazine for continuous image recording or the like. The stimulable phosphor sheets each carrying a radiation image stored thereon are sequentially housed in a sheet housing magazine, which is then sent to a read-out apparatus for carrying out the image read-out from the housed stimulable phosphor sheets. For this purpose, in order to process also the sheet housing magazine, it is necessary for the aforesaid read-out apparatus to be provided with the aforesaid cassette holding section and a magazine holding section for releasably holding the sheet housing magazine. However, in the case where the cassette holding section and the magazine holding section are provided independently as sheet feed sections, the apparatus becomes complicated, large and expensive.

SUMMARY OF THE INVENTION

The primary object of the present invention is to provide a radiation image read-out apparatus wherein a stimulable phosphor sheet is taken out from both a cassette and a magazine and subjected to image read-out with a simple configuration.

Another object of the present invention is to provide a radiation image read-out apparatus which enables image read-out from a stimulable phosphor sheet taken out from both a cassette and a magazine and which is small and cheap.

The present invention provides a radiation image read-out apparatus comprising:

(i) a sheet feed section capable of selectively holding one of a cassette for housing a single stimulable phosphor sheet carrying a radiation image stored thereon and a magazine for housing a plurality of stimulable phosphor sheets each carrying a radiation image stored thereon, said sheet feed section being provided with a sheet take-out means for taking said stimulable phosphor sheet out of said cassette and said magazine, (ii) a read-out section for reading out said radiation image by exposing said stimulable phosphor sheet to stimulating rays which cause said stimulable phosphor sheet to emit light in proportion to the stored radiation energy, and photoelectrically detecting the emitted light, and (iii) a sheet conveyance means for conveying said stimulable phosphor sheet taken out of said sheet feed section to said read-out section.

The sheet feed section may have a configuration capable of being directly loaded with either one of the magazine and the cassette. Alternatively, the sheet feed section may have a configuration adapted to the magazine by way of example, and an adapter may be fitted to the cassette and the cassette may be loaded in this form to the sheet feed section at the time the cassette is to be used.

With the radiation image read-out apparatus in accordance with the present invention wherein the sheet feed section capable of selectively holding the cassette or the magazine is provided, the image read-out can be carried out for both the stimulable phosphor sheet taken out of the cassette and the stimulable phosphor sheet taken out of the magazine without the apparatus becoming large as in the case where a cassette holding section and a magazine holding section are provided independently. Also, as the same sheet feed section is used for the loading of the cassette and the magazine, a single sheet take-out means can be utilized for both the cassette and the magazine, and the manufacturing cost of the apparatus can be reduced.

DESCRIPTION OF THE PREFERRED EMBODIMENTS

The present invention will hereinbelow be described in further detail with reference to the accompanying drawings.

Figure 1:
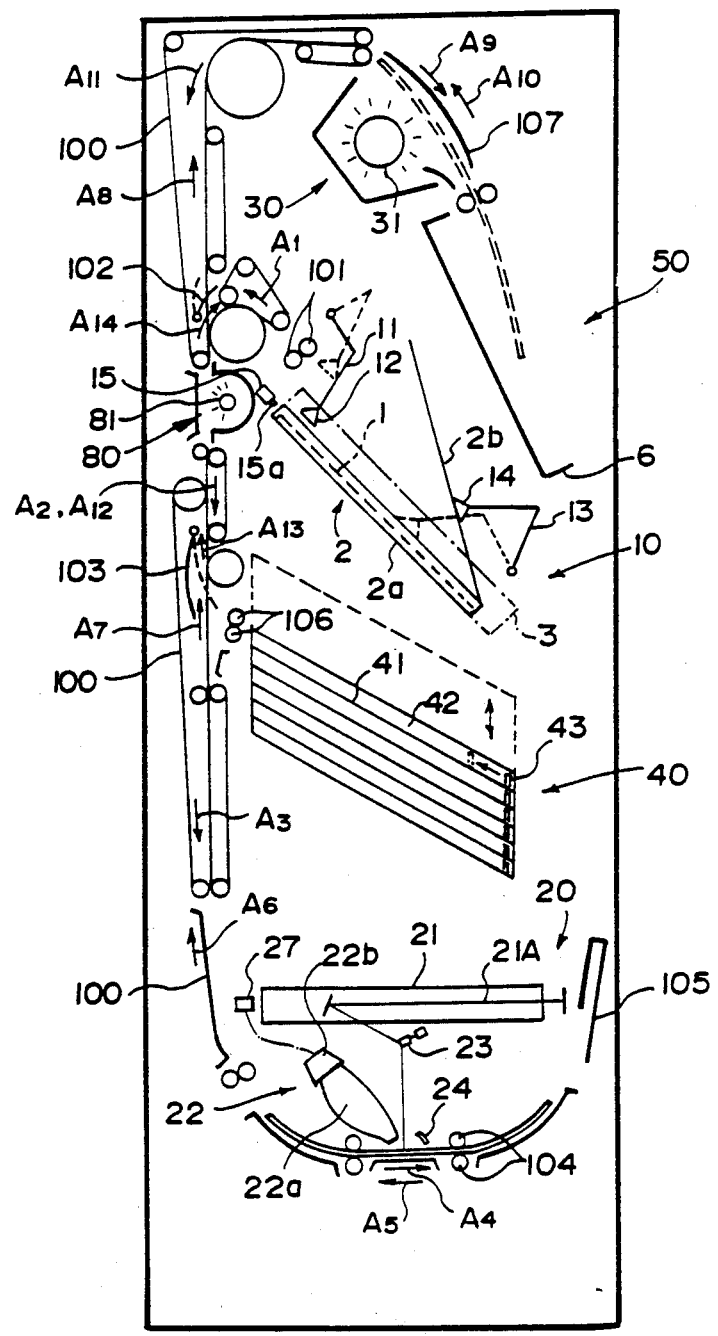
FIG. 1 is a schematic side view showing an embodiment of the radiation image read-out apparatus in accordance with the present invention.

With reference to FIG. 1, an embodiment of the radiation image read-out apparatus in accordance with the present invention is provided with a sheet feed section 10 for selectively holding one of a cassette 2 capable of housing a single stimulable phosphor sheet 1 and a magazine 3 capable of housing a plurality of stimulable phosphor sheets 1, 1, . . . , an image read-out section 20 for reading out a radiation image stored on the stimulable phosphor sheet 1, an erasing section 30 for erasing radiation energy remaining on the stimulable phosphor sheet 1 after image read-out therefrom is finished at the image read-out section 20, and a stacker 40 capable of housing a plurality of the stimulable phosphor sheets 1, 1, . . . therein and feeding out the housed stimulable phosphor sheets 1, 1, . . . one after another. The sections 10, 20, 30 and 40 are provided one above another, and a stimulable phosphor sheet conveyance means 100 extends vertically beside these sections. The aforesaid sections 10, 20, 30 and 40 are connected with the sheet conveyance means 100.

Figure 2:
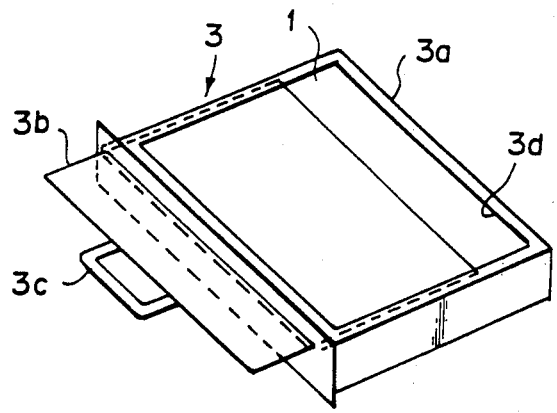
FIG. 2 is a perspective view showing the magazine.
Figure 2:
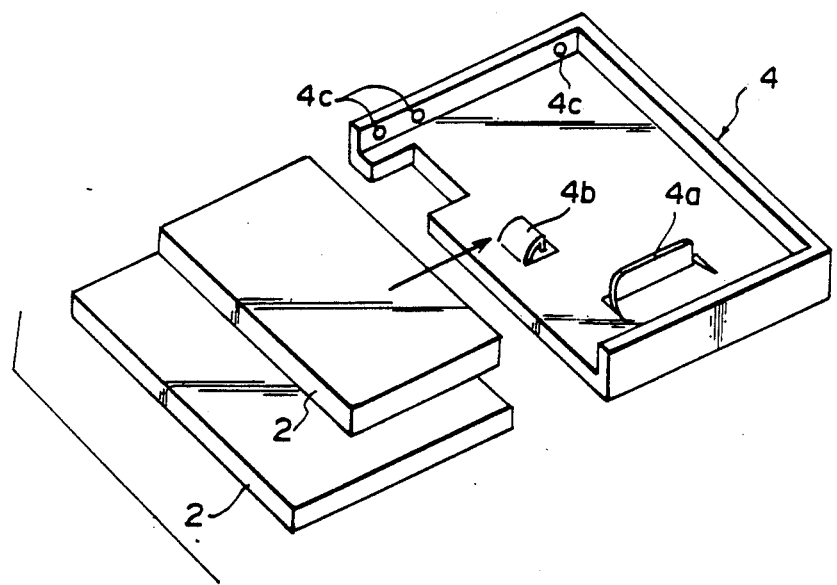

FIG. 2 shows an example of the configuration of the magazine 3 which is fed to the sheet feed section 10 and which is capable of housing a plurality of the stimulable phosphor sheets 1, 1, . . . each carrying a radiation image stored thereon in an external image recording apparatus. With reference to FIG. 2, the magazine 3 comprises a magazine body 3a for holding the stimulable phosphor sheet 1 and provided with an opening 3d in an upper surface, and a cover member 3b for opening and closing the opening 3d by sliding on the opening 3d. The sheet feed section 10 in the embodiment shown in FIG. 1 directly holds the magazine 3. The magazine 3 is fed to the sheet feed section 10 from the direction normal to the drawing sheet in FIG. 1, and then the cover member 3b is pulled out reversely to the direction of feeding of the magazine 3 by the gripping of a handle 3c, thereby to open the upper surface of the magazine body 3a. The sheet feed section 10 is provided with a suction cup 12 supported on a swingable arm 11 as a stimulable phosphor sheet take-out means. The suction cup 12 sucks and takes out the stimulable phosphor sheets 1, 1, . . . one after another from the magazine 3.

Figure 3:
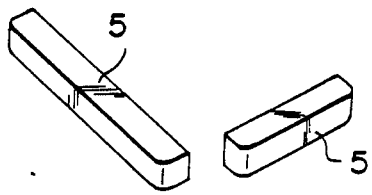
FIG. 3 is a perspective view showing the cassette, the adapter and position adjusting plates.

On the other hand, in the case where the cassette 2 housing the stimulable phosphor sheet 1 which has been subjected to image recording in an external image recording apparatus in the form housed in the cassette 2 is fed to the sheet feed section 10, the cassette 2 is fed to the apparatus in the form fitted to an adapter 4 as shown in FIG. 3. As shown in FIG. 1, the cassette 2 comprises a cassette body 2a in which the stimulable phosphor sheet 7 is to be housed and an openable cover member 2b. The cassette 2 is fitted into the adapter 4 with the cover member 2b closed and facing up. The adapter 4 has the same outer shape as the magazine 3 and can support therein one of various sizes of cassettes 2, 2, . . . Specifically, stoppers 4a and 4b for adjusting the position of the cassette 2 in two directions are formed in the inner surface of the adapter 4. In the case where the size of the cassette 2 is small, the cassette 2 is positioned and secured by the stoppers 4a and 4b and the inner wall faces of the adapter 4. Each of the stoppers 4a and 4b is of the same type as a leaf spring and readily retracts down when pushing force is applied from above. In the case where the cassette 2 having a large size is fitted to the adapter 4 in the direction as indicated by the arrow in FIG. 3, the stoppers 4a and 4b are pushed down by the cassette 2, and the cassette 2 is secured only the the inner wall faces of the adapter 4. The cassette fitting portions of the stoppers 4a and 4b are tapered so that the cassette 2 having a large size is not scratched by the stoppers 4a and 4b at the time the cassette 2 is fitted to the adapter 4. In the case where a cassette 2 having a smaller size is to be secured in the adapter 4, position adjusting plates 5, 5 as shown in FIG. 3 may be inserted more inward than the stoppers 4a and 4b in accordance with the size of the cassette 2. Also, holes 4c, 4c, . . . for allowing the fitting of a lock release means are provided in the wall of the adapter 4, which contacts lock release holes of the cassette 2, at positions corresponding to the lock release holes of the cassette 2.

After the cassette 2 fitted to the adapter 4 has been fed to the sheet feed section 10 from the direction normal to the drawing sheet in FIG. 1 in the same manner as the magazine 3, pins 15a, 15a, . . . of a lock release means 15 provided at the sheet feed section 10 are engaged with the lock release holes of the cassette 2 via the holes 4c, 4c, . . . of the adapter 4, and release the lock of the cover member 2b of the cassette 2. Thereafter, a suction cup 14 supported on a swingable arm 13 as a cover opening means sucks up and opens the cover member 2b, and the stimulable phosphor sheet 1 in the cassette 2 is sucked up and taken out by the suction cup 12. In each of the cassette 2 and the magazine 3, the stimulable phosphor sheet 1 has been housed with its front surface provided with a stimulable phosphor layer facing down. The stimulable phosphor sheet 1 taken out of the cassette 2 or the magazine 3 in the manner as mentioned above is transferred to nip rollers 101, 101 as a part of the sheet conveyance means 100.

The sheet conveyance means 100 is composed of endless belts, guide plates, rollers, and sheet distributing means. The stimulable phosphor sheet 1 whose leading edge portion is grasped between the nip rollers 101, 101 is conveyed by the sheet conveyance means 100 in the direction as indicated by the arrow A1, guided by the sheet distributing means 102 positioned as indicated by the solid line, and is then conveyed in the directions as indicated by the arrows A2 and A3 to the read-out section 20. Also, a secondary erasing section 80 is provided in the conveyance path of the stimulable phosphor sheet 1 for carrying out secondary erasing by an erasing light source 81 as will be described later. The erasing light source 81 is maintained off at the time the stimulable phosphor sheet 1 taken out of the sheet feed section 10 is conveyed from above the secondary erasing section 80. Also, at the time the stimulable phosphor sheet 1 taken out of the cassette 2 or the magazine 3 is directly sent to the read-out section 20, a sheet distributing means 103 provided between the secondary erasing section 80 and the read-out section 20 is maintained at the position as indicated by the solid line, and allows the stimulable phosphor sheet 1 to be conveyed downward.

The read-out section 20 is operated for scanning the stimulable phosphor sheet 1 carrying a radiation image stored thereon by a laser beam 21A as stimulating rays which cause the stimulable phosphor sheet 1 to emit light in proportion to the stored radiation energy, and photoelectrically detecting the emitted light by a photoelectric read-out means 22 constituted by a photomultiplier or the like to obtain electric image signals for use in reproduction of a visible image. Reference numeral 21 denotes, by way of example, a He-Ne laser beam source, and reference numeral 23 denotes a light deflector such as a galvanometer mirror. Reference numeral 24 designates a reflection mirror for reflecting the light emitted by the stimulable phosphor sheet 1 towards a light guide member 22a of the photoelectric read-out means 22. The light guide member 22a guides the light through total reflection therein up to a photodetector 22b constituted by a photomultiplier or the like.

The stimulable phosphor sheet 1 sent to the read-out section 20 is conveyed by the sheet conveyance means 100 in the direction as indicated by the arrow A4, and the overall surface of the stimulable phosphor sheet 1 is scanned two-dimensionally by the laser beam 21A deflected approximately normal to the direction of conveyance and caused by the laser beam 21A to emit light in proportion to the stored radiation energy. The light emitted by the stimulable phosphor sheet 1 in the course of the scanning is photoelectrically detected by the photodetector 22b via the light guide member 22a. The emitted light is converted by the photodetector 22b into electric image signals, and the electric signals thus obtained are sent to an image processing circuit 27 for carrying out image processing on the electric signals. After the image read-out from the overall surface of the stimulable phosphor sheet 1 is finished, the leading edge of the stimulable phosphor sheet 1 contacts a guide plate 105 with the tailing edge thereof being grasped between nip rollers 104, 104. From this position, the stimulable phosphor sheet 1 is switched back and conveyed in the direction as indicated by the arrow A5.

As for the radiation image read-out, there has heretofore been known a method wherein preliminary read-out for approximately ascertaining the radiation image stored on the stimulable phosphor sheet 1 is carried out prior to the aforesaid image read-out (final read-out) for obtaining electric image signals for use in reproduction of a visible image, image read-out conditions for the final read-out or the like are adjusted based on the information obtained by the preliminary read-out, and the final read-out is carried out by use of the adjusted read-out conditions.

As disclosed in, for example, Japanese Unexamined Patent Publication No. 58(1983)-67240, the preliminary read-out may be conducted by scanning the stimulable phosphor sheet 1 with stimulating rays having stimulation energy of a level lower than the level of the stimulation energy of the laser beam (stimulating rays) used in the final read-out, and detecting the light emitted by the stimulable phosphor sheet 1 in the course of the scanning by a photoelectric read-out means.

The read-out section 20 may be constituted to carry out only the final read-out or both the preliminary read-out and the final read-out. For example, the preliminary read-out may be carried out by conveying the stimulable phosphor sheet 1 in the direction as indicated by the arrow A4, the stimulable phosphor sheet 1 may then be switched back and reversely conveyed in the direction as indicated by the arrow A5 to the read-out start position, and then the final read-out may be carried out while the stimulable phosphor sheet 1 is again conveyed in the direction as indicated by the arrow A4. The optical members at the read-out section 20 are not limited to those as mentioned above. For example, as proposed in Japanese Unexamined Patent Publication No. 62(1987)-16666, a long photomultiplier may be disposed along the main scanning line as the photoelectric read-out means for detecting the light emitted by the stimulable phosphor sheet 1.

A comparatively long time is taken for carrying out the image read-out at the read-out section 20, and therefore it often occurs that processing of the stimulable phosphor sheets cannot be achieved efficiently in the case where a new image-recorded stimulable phosphor sheet 1 is taken out of the sheet feed section 10 after processing of the preceding stimulable phosphor sheet 1 is finished at the read-out section 20. Accordingly, this embodiment is provided with the stacker 40, so that the stimulable phosphor sheet 1 fed out of the sheet feed section 10 may be conveyed into the stacker 40 and made to wait for conveyance to the read-out section 20 in accordance with the condition of the read-out section 20.

The stacker 40 comprises a plurality of stimulable phosphor sheet housing compartments 42, 42, . . . defined by partitions 41, 41, . . . , and is moveable vertically in the direction as indicated by the arrow between the position as indicated by the solid line and the position as indicated by the broken line, so that every stimulable phosphor sheet housing compartment 42 can face nip rollers 106, 106 disposed in the vicinity of the stacker 40. In the course of conveying the stimulable phosphor sheet 1 fed out of the sheet feed section 10 into the stacker 40, the sheet distributing means 103 is moved to the position as indicated by the broken line for guiding the stimulable phosphor sheet 1 conveyed from above toward the stacker 40. The stimulable phosphor sheet 1 is conveyed into a predetermined stimulable phosphor sheet housing compartment 42 of the stacker 40. After the tailing edge of the stimulable phosphor sheet 1 separates from the nip rollers 106, 106, the stimulable phosphor sheet 1 falls by its weight and is held with its leading edge contacting a stopper 43 in the stimulable phosphor sheet housing compartment 42. When the stimulable phosphor sheet 1 is to be fed out of the stacker 40, the stacker 40 is moved until the stimulable phosphor sheet housing compartment 42 in which the stimulable phosphor sheet 1 is housed faces the nip rollers 106, 106, the stopper 43 is then moved to the position as indicated by the broken line to push up the stimulable phosphor sheet 1 and to have the leading edge portion of the stimulable phosphor sheet 1 grasped by the nip rollers 106, 106. The stimulable phosphor sheet 1 grasped by the nip rollers 106, 106 is guided by the sheet distributing means 103 maintained at the position as indicated by the broken line, is conveyed upward by the sheet conveyance means 100, and is then conveyed in the direction as indicated by the arrow A3 into the read-out section 20. At this time, the stimulable phosphor sheet 1 fed out of the stacker 40 is once conveyed upward in this manner so that the surface of the stimulable phosphor sheet 1 provided with a stimulable phosphor faces up (i.e. the laser beam irradiation side) at the read-out section 20.

After the image read-out from the stimulable phosphor sheet 1 is finished at the read-out section 20, the stimulable phosphor sheet 1 is conveyed by the sheet conveyance means 100 in the directions as indicated by the arrows A6, A7 and A8 into the erasing section 30. At this time, the sheet distributing means 102 is maintained at the position as indicated by the broken line, and the sheet distributing means 103 is maintained at the position as indicated by the solid line.

At the erasing section 30, radiation energy remaining on the stimulable phosphor sheet 1 after the image read-out therefrom is finished is erased. Specifically, a part of the radiation energy stored on the stimulable phosphor sheet 1 at the image recording step remains stored thereon after the image read-out is carried out. In order to reuse the stimulable phosphor sheet 1, the residual radiation energy is erased at the erasing section 30. In this embodiment, the erasing section 30 is provided with a plurality of erasing light sources 31, 31, . . . constituted by fluorescent lamps, tungsten-filament lamps, sodium lamps, xenon lamps, iodine lamps or the like, and the stimulable phosphor sheet 1 is exposed to the erasing light emitted by the erasing light sources 31, 31, . . . for releasing the residual radiation energy from the stimulable phosphor sheet 1 while the stimulable phosphor sheet 1 is conveyed along a guide plate 107 in the direction as indicated by the arrow A9. At the erasing section 30, any known erasing method may be used. For example, erasing may be conducted by heating or by a combination of exposure to the erasing light with heating. Also, a tray holding section 50 for releasably holding a tray capable of housing a plurality of the stimulable phosphor sheets 1, 1, . . . is provided adjacent the erasing section 30. In the case where the erased stimulable phosphor sheet 1 is the one that was taken out of the magazine 3, the stimulable phosphor sheet 1 is conveyed into the tray 6. On the other hand, in the case where the stimulable phosphor sheet 1 which is to be subjected to the erasing is the one that was taken out of the cassette 2, stimulable phosphor sheet 1 is erased by being conveyed to the position indicated by the broken line, and is then conveyed reversely in the direction as indicated by the arrow A10. The stimulable phosphor sheet 1 is then conveyed by the sheet conveyance means 100 in the directions as indicated by the arrows A11 and A12, and is housed in the empty sheet housing compartment 42 of the stacker 40 by being guided by the sheet distributing means 103 moved to the position as indicated by the broken line. In the case where some erased reusable stimulable phosphor sheets 1, 1, . . . are housed in the stacker 40 in this manner and the cassette 2 is fed to the sheet feed section 10, the erased reusable stimulable phosphor sheet 1 can be conveyed into the empty cassette 2 immediately after the image-recorded stimulable phosphor sheet 1 has been fed out of the cassette 2. When the stimulable phosphor sheet 1 is to be fed out of the stacker 40 and conveyed to the sheet feed section 10, the sheet distributing means 103 is moved to the position as indicated by the broken line, the sheet distributing means 102 is moved to the position as indicated by the solid line, and the stimulable phosphor sheet 1 is conveyed by the sheet conveyance means 100 in the directions as indicated by the arrows A13 and A14 into the cassette 2. The stimulable phosphor sheet 1 conveyed out of the stacker 40 may have often been maintained in the stacker 40 and a long time may have elapsed after the stimulable phosphor sheet 1 was subjected to erasing at the erasing section 30. In the case where at least a predetermined time elapses after the erasing was carried out on the stimulable phosphor sheet 1, the stimulable phosphor sheet 1 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the stimulable phosphor sheet 1 cause noise in a radiation image recorded next on the stimulable phosphor sheet 1. In order to prevent noise generation, the secondary erasing section 80 for irradiating the erasing light to the stimulable phosphor sheet 1 is disposed in the conveyance path between the stacker 40 and the sheet feed section 10. The erasing light source 81 at the secondary erasing section 80 is turned on only when the stimulable phosphor sheet 1 fed out of the stacker 40 is conveyed toward the sheet feed section 10, thereby to release the radiation energy stored on the stimulable phosphor sheet 1 while the stimulable phosphor sheet 1 is being housed in the stacker 40. The cassette 2 loaded with the erased reusable stimulable phosphor sheet 1 in this manner is taken out of the read-out apparatus for reuse in image recording. In this embodiment, the stimulable phosphor sheet 1 erased at the erasing section 30 may be immediately conveyed into the cassette 2. In this case, the stimulable phosphor sheet 1 conveyed in the direction as indicated by the arrow A11 from the erasing section 30 may once be conveyed downward, then switched back upward and conveyed into the cassette 2. As a result, the surface of the stimulable phosphor sheet 1 provided with the stimulable phosphor layer can be made to face down when the stimulable phosphor sheet 1 is housed in the cassette 2.

Figure 4:
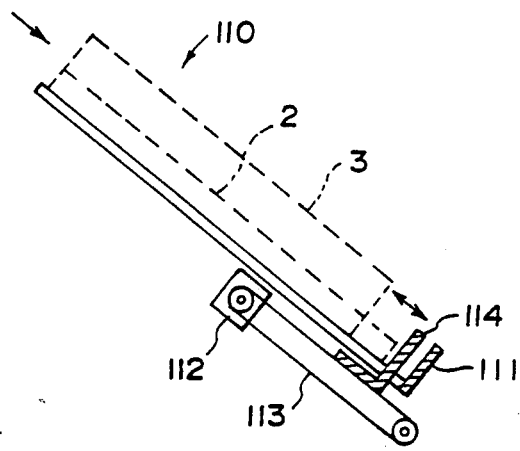
FIG. 4 is a schematic view showing an example of the configuration of the sheet feed section.

In this embodiment wherein one of the cassette 2 and the magazine 3 is selectively fed to the sheet feed section 10, the apparatus can be made smaller than in the case where both a cassette holding section and a magazine holding section are provided. Also, a single take-out means for the stimulable phosphor sheet 1 can be utilized for both the cassette 2 and the magazine 3. In the aforesaid embodiment, the sheet feed section 10 is formed with reference to the size of the magazine 3, and the adapter 4 is used at the time the cassette 2 is to be fed to the sheet feed section 10. However, the configuration of the sheet feed section 10 may be modified to be capable of holding one of the cassette 2 and the magazine 3 without using the adapter 4. Specifically, with reference to FIG. 4, a sheet feed section 110 is provided with a frame 111 having a height adapted to the height of the magazine 3 and a length adapted to the length of the longest one between the magazine 3 and the cassette 2. A position adjusting plate 114 secured to an endless belt 113 operated by a motor 112 is provided in the frame 111. The size of the cassette 2 or the magazine 3 fed to the sheet feed section 110 is detected, and the position adjusting plate 114 is moved so that the upper edges of the cassette 2 and the magazine 3 always align with a predetermined position, thereby to hold the cassette 2 or the magazine 3 in accordance with the size thereof. With this sheet feed section 110, even a cassette 2 larger than the magazine 3 can be fed thereto. The cassette 2 or the magazine 3 is fed to the sheet feed section 110 from above the frame 111 obliquely in the direction as indicated by the arrow in FIG. 4. In this case, release of the lock of the cassette 2 is effected by the direct engagement of the lock release means with the lock release holes of the cassette 2, and opening of the cover member of the cassette 2 and take-out of the stimulable phosphor sheet 1 from the cassette 2 or the magazine 3 are carried out in the same manner as in the embodiment shown in FIG. 1.

The overall configuration of the radiation image read-out apparatus in accordance with the present invention is not limited to the embodiment shown in FIG. 1. The stacker 40 may be omitted in the case where processing of the next stimulable phosphor sheet 1 may be carried out after processing of a preceding stimulable phosphor sheet 1 is completed. In this case, also the stimulable phosphor sheet 1 taken out of the cassette 2 and subjected to the erasing may be conveyed into the tray 6 at the tray holding section 50 without being returned into the cassette 2. Also, the radiation image read-out apparatus in accordance with the present invention may be constituted to carry out only the image read-out, and the erasing section 30 need not necessarily be provided.

Figure 5:
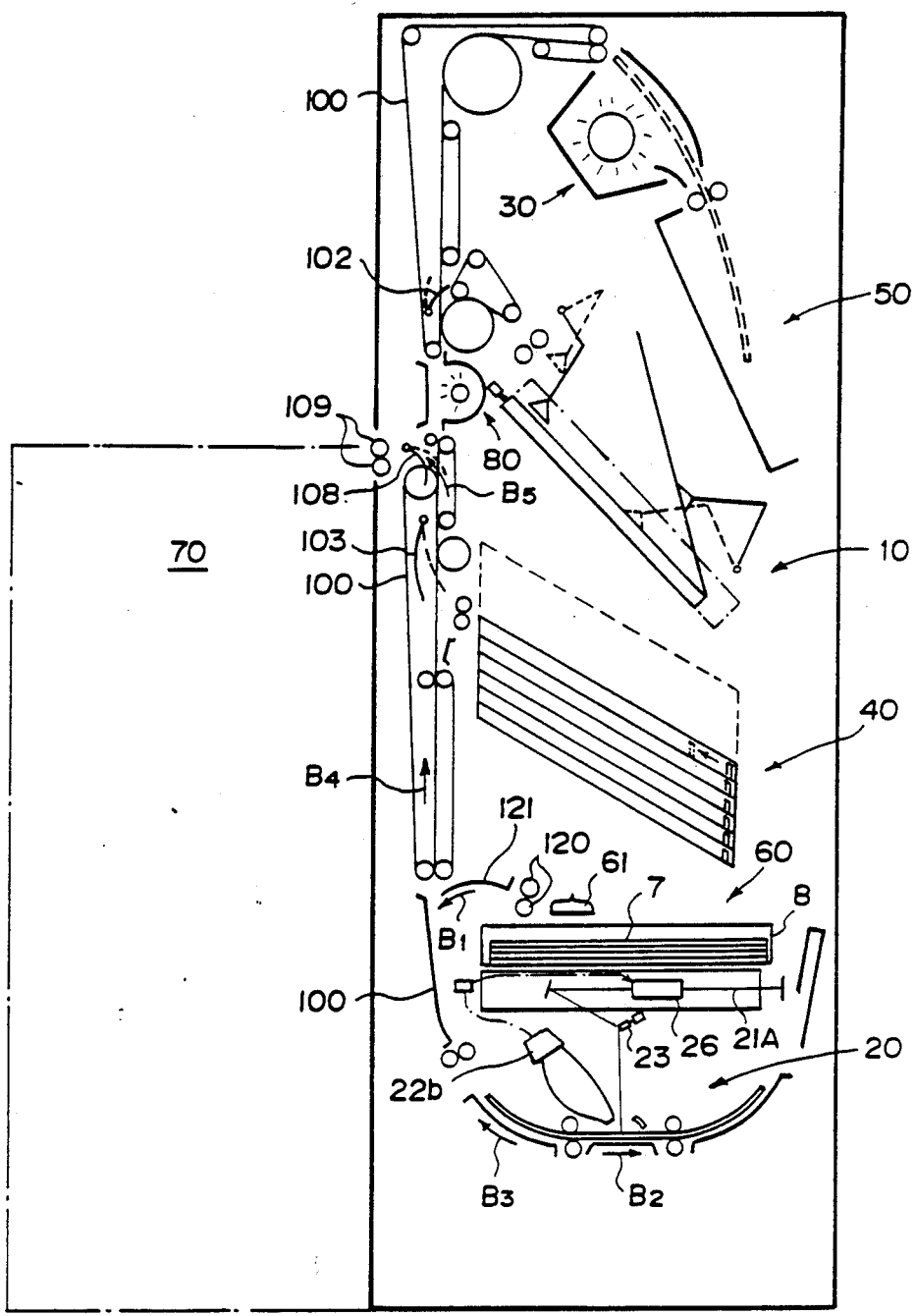
FIG. 5 is a schematic side view showing another embodiment of the radiation image read-out apparatus in accordance with the present invention.

On the other hand, the radiation image read out by the aforesaid read-out apparatus can be reproduced as a visible image recorded on a recording sheet by scanning the recording sheet with a light beam modulated in accordance with the radiation image. The reproducing apparatus for reproducing the radiation image into a visible image has heretofore been provided independently of the read-out apparatus. In recent years, there has arisen an increasing need for making the overall radiation image recording and reproducing system small. Therefore, the applicant proposed in, for example, Japanese Patent Application No. 62(1987)-5263, a read-out and reproducing apparatus wherein a radiation image read-out apparatus and a reproducing apparatus are combined integrally. The radiation image read-out apparatus in accordance with the present invention may be constituted as a read-out and reproducing apparatus provided with a reproducing apparatus integrally. An embodiment of the radiation image read-out apparatus in accordance with the present invention integrally combined with a reproducing apparatus will hereinbelow be described with reference to FIG. 5. In FIG. 5, similar elements are numbered with the same reference numerals with respect to FIG. 1.

In the embodiment shown in FIG. 5, the image read-out and erasing on the stimulable phosphor sheet 1 are carried out in the same manner as in the embodiment shown in FIG. 1. A light modulator 26 is provided at the read-out section 20, and the operation of the light modulator 26 is stopped as long as the image read-out from the stimulable phosphor sheet 1 is being carried out at the read-out section 20.

In this embodiment, a recording sheet feed section 60 for releasably holding a recording sheet magazine 8 capable of housing therein a plurality of recording sheets 7, 7, . . . is provided above the read-out section 20. At the time the image read-out from a single stimulable phosphor sheet 1 has been finished at the read-out section 20, a single recording sheet 7 is taken by a suction means 61 out of the recording sheet magazine 5 at the recording sheet feed section 60, and transferred to nip rollers 120, 120 in the vicinity of the recording sheet feed section 60. The recording sheet 7 is conveyed by the nip rollers 120, 120 along a guide plate 121 in the direction as indicated by the arrow B1, and is then conveyed by the sheet conveyance means 100 into the read-out section 20 in the same manner as the stimulable phosphor sheet 1. At the read-out section 20, the radiation image which was read from the stimulable phosphor sheet 1 in the manner as mentioned above is recorded on the recording sheet 7 while the recording sheet 7 is being conveyed in the direction as indicated by the arrow B2.

At the time the recording sheet 7 is thus conveyed in the read-out section 20, the the light modulator 26 is operated in accordance with the image signals which were detected from the stimulable phosphor sheet 1, and the operation of the photodetector 22b is stopped. The recording sheet 7 is scanned by the laser beam 21A now acting as the recording light modulated by the light modulator 26 and deflected by the light deflector 23, so that the radiation image which was stored on the stimulable phosphor sheet 1 is reproduced over the overall surface of the recording sheet 7.

After the image reproduction on the recording sheet 7 is finished at the read-out section 20, the recording sheet 7 is conveyed by the sheet conveyance means 100 in the directions as indicated by the arrows B3 and B4. At this time, the sheet distributing means 103 is maintained at the position as indicated by the solid line and guides recording sheet 7 upward. This embodiment is also provided with a sheet distributing means 108 above the sheet distributing means 103. As long as the stimulable phosphor sheet 1 is being conveyed by the sheet conveyance means 100, the sheet distributing means 108 is maintained at the position as indicated by the solid line. When the recording sheet 7 is conveyed in the direction as indicated by the arrow B4 as mentioned above, the sheet distributing means 108 is moved to the position as indicated by the broken line, thereby to guide the recording sheet 7 in the direction as indicated by the arrow B5 and to have the leading edge of the recording sheet 7 grasped between ejection rollers 109, 109. By way of example, the ejection rollers 109, 109 may convey the recording sheet 7 to an automatic developing section 70 connected to the read-out apparatus. Alternatively, a tray or the like may be positioned close to the ejection rollers 109, 109, and the recording sheets 7, 7, . . . may be sequentially ejected into the tray or the like. Also, a holding section for the recording sheet housing tray may be provided inside of the read-out apparatus, and the recording sheets 7, 7, . . . may be taken out of the apparatus in the form housed in the tray and sent to an external automatic developing machine.

At the read-out section 20, the reproduction of the radiation image read out from a single stimulable phosphor sheet 1 is carried out on a single recording sheet 7 immediately after the image read-out is carried out on the stimulable phosphor sheet 1. Instead, the image read-out may be carried out continuously for a plurality of the stimulable phosphor sheets at the read-out section 20, image signals thus detected may be stored in a memory, and then the image reproduction may be carried out continuously on a plurality of the recording sheets. Also, instead of reproducing all of the read-out radiation images as hard copies on the recording sheets, the radiation images may be displayed on a display device such as a CRT, and only the necessary images may be reproduced as hard copies on the recording sheets. Also, from the viewpoint of making the apparatus small and reducing the manufacture cost thereof, the read-out section 20 should preferably be formed integrally with the image reproducing section by utilizing the conveyance means and the laser beam scanning system in common in the manner as mentioned above. However, the image reproducing section may be formed besides the sheet conveyance means independently of the read-out section.

As the recording sheet, a heat development photosensitive material, an instant film or the like may be used as well as the silver halide photographic film utilizing the ordinary wet development process. Also, besides the photosensitive recording materials, a heat-sensitive recording material may also be used.

I claim:

1. A radiation image read-out apparatus comprising:
   (i) a sheet feed section capable of selectively holding one of a cassette for housing a single stimulable phosphor sheet carrying a radiation image stored thereon and a magazine for housing a plurality of stimulable phosphor sheets each carrying a radiation image stored thereon, said sheet feed section being provided with a sheet take-out means for taking said stimulable phosphor sheet out of said cassette and said magazine,
   (ii) a read-out section for reading out said radiation image by exposing said stimulable phosphor sheet to stimulating rays which cause said stimulable phosphor sheet to emit light in proportion to the stored radiation energy, and photoelectrically detecting the emitted light, and
   (iii) a sheet conveyance means for conveying said stimulable phosphor sheet taken out of said sheet feed section to said read-out section.

2. An apparatus as defined in claim 1 wherein said sheet feed section has a size adapted to the holding of said magazine, and said cassette is fed in the form fitted to an adapter to said sheet feed section.

3. An apparatus as defined in claim 1 wherein said sheet feed section is provided with a moveable position adjusting plate, and selectively holds said cassette or said magazine by moving said position adjusting plate in accordance with the size of said cassette or said magazine.

4. An apparatus as defined in claim 1 wherein said read-out section is constituted for acting in the same manner as an image reproducing section for reproducing said radiation image as a visible image on a recording sheet.

* * * * *